(No Model.)
C. CHRISTIANSON.
POTATO HARVESTER.
No. 530,395. Patented Dec. 4, 1894.
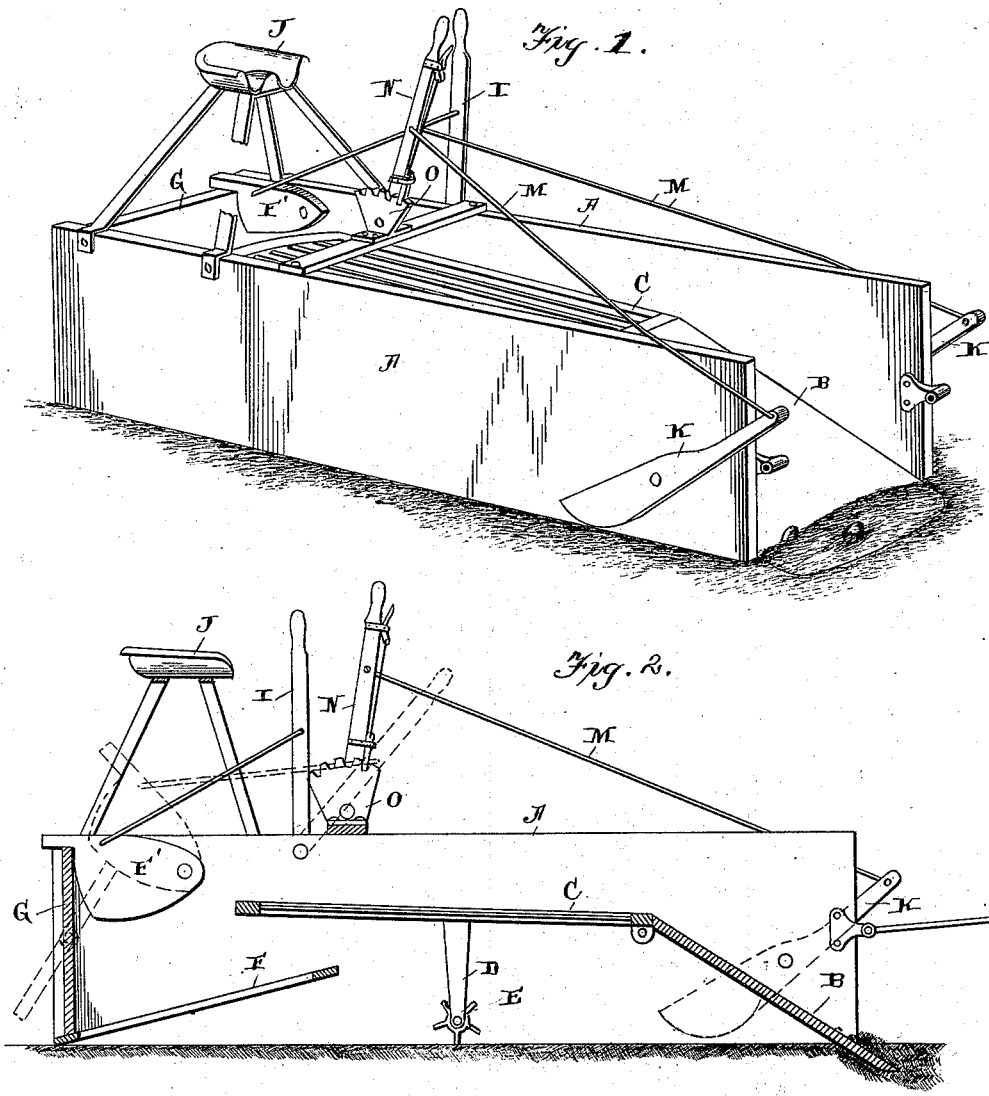
WITNESSES:
INVENTOR
Charles Christianson
BY
Lehmann Pattison Nesbit
ATTORNEY.

UNITED STATES PATENT OFFICE.

CHARLES CHRISTIANSON, OF VILAS, SOUTH DAKOTA.

POTATO-HARVESTER.

SPECIFICATION forming part of Letters Patent No. 530,395, dated December 4, 1894.

Application filed November 7, 1893. Serial No. 490,251. (No model.)

*To all whom it may concern:*

Be it known that I, CHARLES CHRISTIANSON, of Vilas, in the county of Miner and State of South Dakota, have invented certain new and useful Improvements in Potato-Harvesters; and I do hereby declare the following to be a full, clear, and exact description of the invention, such as will enable others skilled in the art to which it pertains to make and use it, reference being had to the accompanying drawings, which form part of this specification.

My invention relates to an improvement in potato harvesters, and the object of the same is to construct a very simple machine which will effectually dig the potatoes and separate them from the earth, and finally discharge them into a receptable at the rear end of the machine, which latter may be easily dumped when full or at given intervals as may be desired.

The invention consists in the novel features of construction hereinafter fully described and claimed and illustrated in the accompanying drawings, in which—

Figure 1, is a perspective view of my improved machine. Fig. 2, is a vertical longitudinal sectional view of the same.

A designates the vertical sides of the harvester, which I term "runners," and extending diagonally downward between their forward ends and slightly protruding therefrom is the plow B. Immediately behind this plow and inclined backward from the upper end of the same is the shaker C, which is formed of a series of rods arranged closely together, as shown, and which shaker is provided upon its under side with standards D having mounted therein the toothed wheel E. Thus it will be seen that as the harvester moves along over the ground the said toothed wheel engaging the same will tend to vibrate the shaker upon its hinges, thus causing the fine dirt to settle therethrough and the potatoes to run to the rear end of the shaker as a result of the latter being upon a slight incline.

An inclined bottom F, leads to the lower rear end of the machine, and over the end of which is arranged the hinged door G, which is held normally closed, by the stop F' pivoted upon the inner side of frame A, as shown. Connected to this stop is a handle I within easy reach of an operator occupying seat J, which handle when turned forward tends to raise the said latch and permit the door to swing upon its pivot and allow the potatoes to roll downward and discharge off the inclined bottom F.

For the purpose of throwing the harvester into an inoperative position I provide arms K secured between their ends to the opposite end of shaft L which extends transversely and connected to the upper end of one of these arms is rod M which at its rear end is secured to ratchet lever N carried by frame A, and which is held in the desired adjustment by the rack O. By this arrangement it will be seen that when the harvester is to be thrown out of gear all that is necessary to accomplish this operation is to pull backward upon lever N, which will throw downward the lower ends of arms K into engagement with the ground, thus elevating the plow B therefrom into an inoperative position. By this arrangement I am enabled to move the harvester from place to place with ease and without engaging the ground traversed, by the plow.

A harvesting machine constructed as herein shown and described is very simple in operation, yet most effective in digging and separating the potatoes from the fine earth. The potatoes may be discharged at intervals so as to be arranged in rows extending transversely across the field, or the same may be allowed to remain in the receptacle at the rear end of the harvester until the same has been filled and then dumped irrespective of any other places where the same may have been emptied.

Having thus described my invention, what I claim, and desire to secure by Letters Patent, is—

In a potato harvester, the combination of a frame, a digging mechanism depending therefrom, arms K pivoted to the frame as shown, converging rods M, and lever F to which they are connected arranged centrally on the frame, substantially as shown and described.

In testimony whereof I affix my signature in presence of two witnesses.

CHARLES CHRISTIANSON.

Witnesses:
A. W. WINDEN,
G. C. McINTYRE.